United States Patent [19]

Inoue

[11] Patent Number: 4,459,190
[45] Date of Patent: Jul. 10, 1984

[54] METHOD OF AND APPARATUS FOR MACHINING A 3-D CAVITY IN A WORKPIECE

[75] Inventor: Kiyoshi Inoue, Tokyo, Japan

[73] Assignee: Inoue-Japax Research Incorporated, Yokohama, Japan

[21] Appl. No.: 452,201

[22] Filed: Dec. 22, 1982

[51] Int. Cl.³ .......................... B23P 1/04; B23P 1/10; B23P 1/12; B23K 9/16

[52] U.S. Cl. .......................... 204/129.35; 204/129.5; 204/129.55; 204/129.7; 204/224 M; 204/225; 219/68; 219/69 M; 29/26 A; 29/26 R

[58] Field of Search ............... 219/69 M, 69 R, 69 D, 219/68; 204/129.35, 129.55, 224 M, 225, 129.5, 129.7; 29/558, 26 A, 26 R; 408/1, 22, 24, 25, 26, 27

[56] References Cited

U.S. PATENT DOCUMENTS

| | | | |
|---|---|---|---|
| 3,223,610 | 12/1965 | Inoue | 204/224 M |
| 3,424,054 | 1/1969 | Cook et al. | 219/68 X |
| 3,459,645 | 8/1969 | Wilson et al. | 204/224 M X |
| 3,816,272 | 6/1974 | Joslin | 204/129.35 X |
| 3,975,608 | 8/1976 | Ullmann et al. | 219/69 M |
| 4,190,938 | 3/1980 | Hillmann et al. | 29/26 A |
| 4,337,566 | 7/1982 | DiMatteo et al. | 29/26 A X |

FOREIGN PATENT DOCUMENTS 703838 2/1954 United Kingdom ........... 204/129.35
848736 9/1960 United Kingdom .

Primary Examiner—Donald R. Valentine
Attorney, Agent, or Firm—Karl F. Ross; Herbert Dubno

[57] ABSTRACT

A method of forming a cavity of a desired three-dimensional contour in a workpiece utilizes two steps of machining operation. In the first step (a), a multiplicity of holes are mechanically drilled in the workpiece substantially all over but within a three-dimensional region which is destined to constitute the cavity and which is bounded by a programmed outline corresponding to the desired three-dimensional contour whereby only a minimum of stock is left unmachined in the workpiece within the region. In the second step of operation (b), the minimum left unmachined stock among the holes and within the region is electroerosively machined with at least one electrical machining tool electrode having a machining surface which is complementary with the desired contour and which is positioned to lie in parallel with the programmed outline, by, (b1) passing an electrical machining current across a machining gap between the machining surface and the region in the presence of an electrical machining liquid in the multiple holes and the gap, and (b2) advancing the tool electrode relatively into the workpiece while maintaining the aforesaid parallelism and holding the machining gap spacing substantially constant until the machining surface reaches a position spaced by the said spacing from the said programmed outline.

20 Claims, 9 Drawing Figures

FIG. 4A
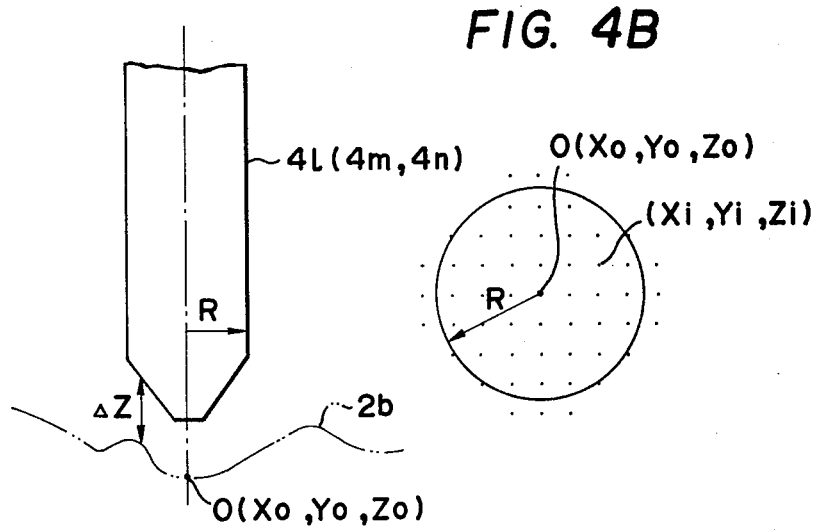
FIG. 4B
FIG. 6
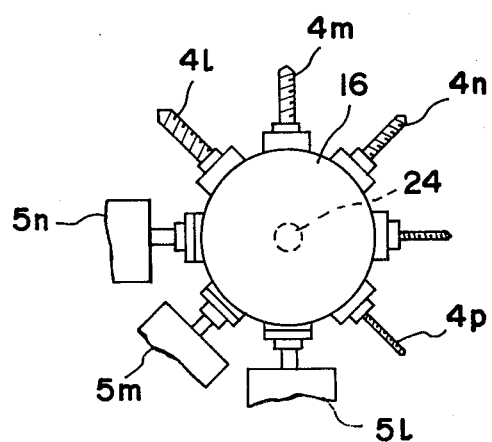

METHOD OF AND APPARATUS FOR MACHINING A 3-D CAVITY IN A WORKPIECE

FIELD OF THE INVENTION

The present invention relates to three-dimensional contour machining and, more particularly, to a new and improved method of and apparatus for forming a cavity of a desired three-dimensional contour in a workpiece to produce, for example, a die or mold.

BACKGROUND OF THE INVENTION

Certain dies, molds and other products need to be shaped generally with intricate three-dimensional contours and these products have hitherto been produced by a milling tool, a grinder or a machine designed to execute electrical discharge machining (EDM) or electrochemical machining (ECM), or a combination of milling, grinding and EDM or ECM machines. To the best of applicant's knowledge, however, there has been no attempt in the art to exploit drilling techniques in making a die, mold or any other intricately contoured product.

It has been recognized that electrical machining processes such as EDM or ECM are capable of reproducing practically any intricate three-dimensional contour with an extremely high precision but have a relatively low rate of material removal. Milling and grinding techniques have also been developed to find use, as one of their major genres of application, in the die or mold machining art where these techniques have been employed to roughly shaped a desired die or mold contour. The die mold contour roughly shaped by milling or grinding is commonly hand-finished by a skilled worker with considerable labor and time expenditure. It has been also been proposed to use electrical machining techniques to finish-machine the contour roughly shaped in a milling or grinding machine.

There is, however, a constant desire to reduce the total time and labor in producing a desired die, mold or other product with an intricate three-dimensional contour.

OBJECTS OF THE INVENTION

It is accordingly an important object of the present invention to provide a novel and improved method of forming a three-dimensional contour, which method is much more efficient than the conventional processes and is capable of drastically reducing the total time expended for producing the desired cavity from a blank material.

Another object of the invention is to provide a novel apparatus, which is relatively compact, for carrying out the method described.

SUMMARY OF THE INVENTION

In accordance with the present invention there is provided, in a first aspect thereof, a method of forming a cavity of desired three-dimensional contour in a workpiece, which method comprises the steps of: (a) mechanically drilling a multiplicity of holes in the workpiece substantially all over but within a three-dimensional region which is destined to constitute said cavity and is bounded by a programmed outline corresponding to the said desired three-dimensional contour whereby only a minimum of stock is left unmachined in the workpiece within the said region; and thereafter (b) electroerosively machining the said minimum left unmachined stock among the said holes and within the said programmed region with at least one electrical machining tool electrode having a machining surface which is complementary in shape with the said desired contour and is positioned to lie in parallel with the said programmed outline, by: (b1) passing an electrical machining current across a machining gap between the said machining surface and said region in the presence of an electrical machining liquid in the said holes and the said gap, and (b2) advancing the tool electrode relatively into the workpiece while maintaining the said parallelism and holding the said machining gap spacing substantially constant until the said machining surface reaches a position spaced by the said spacing from the said programmed outline.

Specifically, in step (a) the said multiple holes are drilled respectively to individually predetermined depths such that an outline defined by the floor regions of the said holes substantially conforms to and is substantially equi-distantly spaced from the said programmed outline. At least most of the multiple holes are conveniently and thus preferably formed so as to extend substantially in parallel with one another.

Preferably, the said multiple holes include a plurality of holes obliquely intersecting the parallel holes and step (b) further includes the step of flushing the said machining liquid through the said oblique holes to create a dynamic flow of the machining liquid through the said machining gap.

Preferably, step (a) is carried out with a plurality of drilling tools having different tool sizes to produce the corresponding plural sets of holes different in diameter. The plural sets of holes are preferably drilled successively in the said region. The parallel holes are preferably oriented in a direction substantially the same as the direction in which the tool electrode is advanced in step (b2). Preferably, the holes at least in a set of the largest hole diameter are drilled in the region with their centers equi-distantly spaced apart from one another, and the holes at least in another set are drilled in interstices among the holes of the largest hole diameter. Preferably, a further set of holes having a smallest hole diameter are included in the multiple holes and are drilled at least in a zone of the region which is closer to the said programmed outline.

Preferably, the said at least one tool electrode includes plurality of electrodes including a roughing and finishing electrodes and in step (b) at least a substantial portion of the said left unmachined stock remaining among said multiple holes is electroerosively removed by the roughing electrode and at least a portion of the said unmachined stock remaining between the outline defined by the floor regions of the holes and the said programmed outline is electroerosively removed with the finishing electrode.

The invention also provides, in a second aspect thereof, an apparatus for carrying out the method according to the said first aspect, which apparatus comprises: a tool carriage for carrying at least one drilling tool and at least one electrical machining tool electrode; control means; means operable in response to command signals from the control means for driving the tool carriage to selectively bring the drilling tool, for carrying out step (a), into a drilling relationship with, and the tool electrode, for carrying out step (b) subsequent to step (a), into an electrical machining relationship with, the workpiece, respectively; means for rotating the drilling tool in step (a); means for supplying the electrical machining liquid into the holes and the machining gap in step (b); means selectively operable in step (b) for supplying the electrical machining current between the tool electrode and the workpiece; and means for advancing the drilling tool in step (a) and the tool electrode in step (b), relatively into the workpiece to drill each of the multiple holes in step (a) and to electroerosively machine the said left unmachined stock in step (b), respectively.

BRIEF DESCRIPTION OF THE DRAWING

These and other features of the present invention as well as advantages thereof will become more readily apparent from a reading of the following description of certain embodiments thereof when made with reference to the accompanying drawing in which:

FIGS. 4(A) and 4(B) are side and cross-sectional views, respectively, diagrammatically illustrating the drilling tool and the workpiece, respectively, and illustrating a manner of setting the depth of each hole in the workpiece according to a method of this invention;

FIG. 6 is a front view diagrammatically illustrating one form of the tool magazine in the apparatus of FIG. 5.

SPECIFIC DESCRIPTION

Figure 1A:
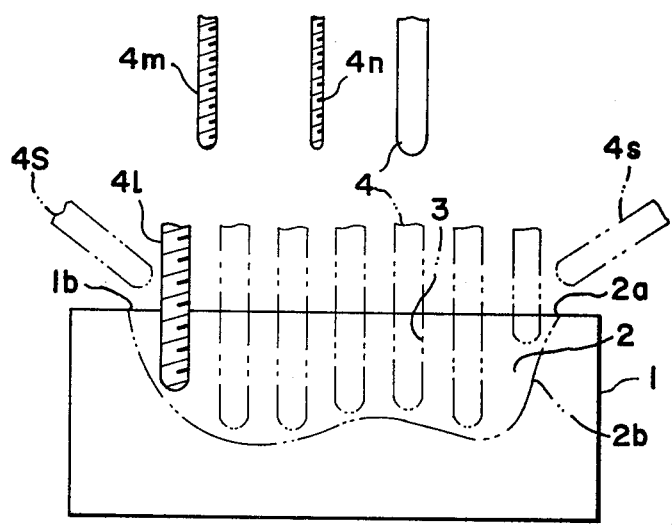
FIG. 1(A) is a side view diagrammatically illustrating a manner in which a multiplicity of holes are mechanically formed in a workpiece with a drilling tool in a three-dimensional cavity forming method according to the present invention.
Figure 1B:
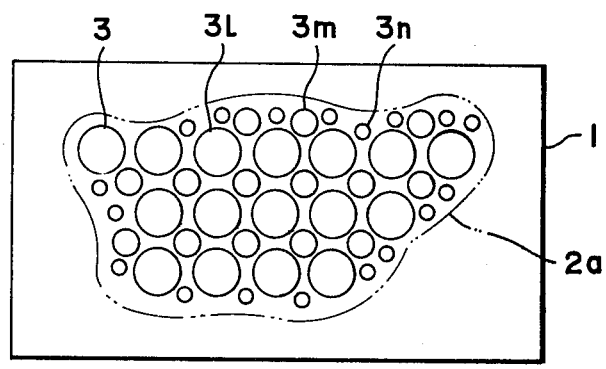
FIG. 1(B) is a top plan view diagrammatically illustrating the workpiece having these holes formed therein.
Figure 2:
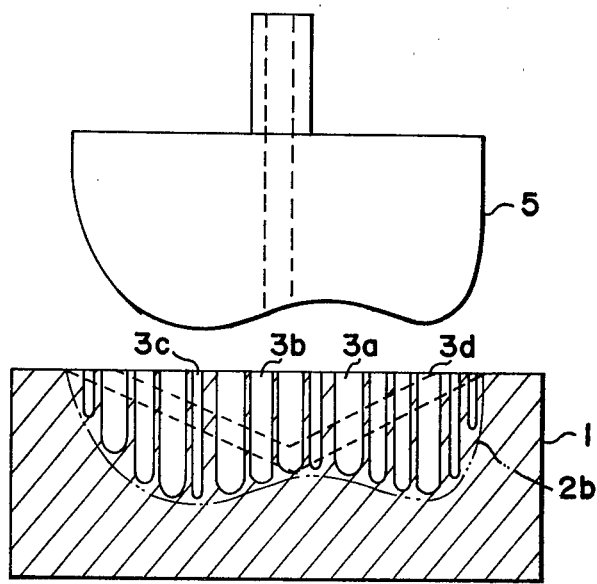
FIG. 2 is a side-sectional view diagrammatically illustrating a manner of electrically machining the workpiece of FIG. 1(B)
Figure 3:
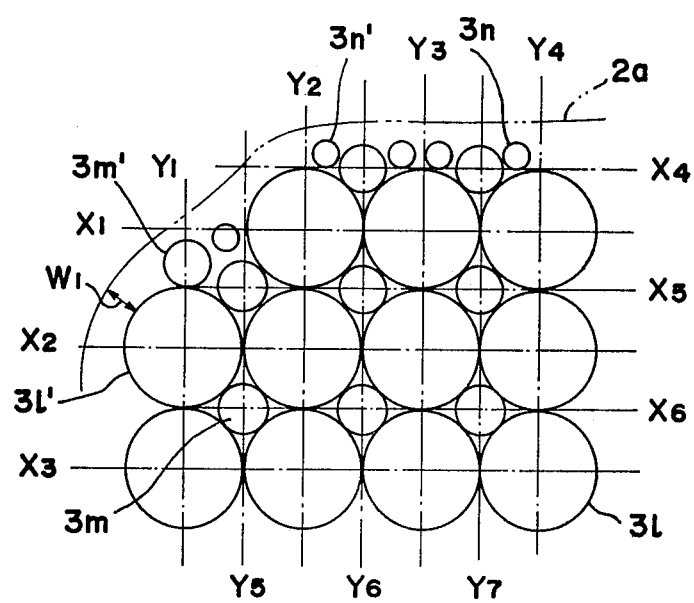
FIG. 3 is a diagrammatic view illustrating a preferred from of drilling the holes in the workpiece in the method according to the invention.

Referring now to the drawing, first to FIGS. 1(A) and 1(B), there is shown a workpiece 1 in the form of a rectangular block in which it is desired to machine a cavity 2 having a rim 2a and a three-dimensional contour 2b to provide, for example, a die. According to the method of this invention, a multiplicity of holes 3 are first mechanically formed with a drilling tool 4 in the workpiece 1 in a region thereof destined to constitute the cavity 2 defined by the rim 2a and the contour 2b. Thereafter the drilled workpiece 1 is, as shown in FIG. 3, subjected to electrical machining such as electrical discharge machining (EDM) or electrochemical machining (ECM) to remove the remaining stock and thus to finish the three-dimensional contour 2b with a tool electrode 5 complementary thereto.

In the drilling step, a single drilling tool 4 of a given diameter may be employed to form multiple holes 3 of a corresponding uniform diameter but it is generally preferred to use drilling tools of varying diameters $4l$, $4m$, $4n$, as shown in FIG. 1(A), to provide plural sets of holes varying in size $3l$, $3m$, $3n$ as shown in FIG. 1(B).

Thus, the tool $4l$ of a large size may first be used to form multiple large holes $3l$ with a given equal pitch successively, each to a given depth within a limit defined by the final contour $2b$. Then, the tool $4m$ of a medium size may be employed to drill multiple medium-diameter holes $3m$ successively again with such a given pitch but in interstices of the large holes $3l$. The tool $4n$ of a small diameter may thereafter be used to drill multiple holes $3n$ in a similar manner in interstices surrounded by the large- and medium-diameter holes $3l$ and $3m$. In FIG. 1(B), the small holes $3n$ are shown as formed at locations in an area closer to the rim $2a$ so that the outline of the holes $3l$, $3m$ and $3n$ distributorily formed substantially corresponds to the rim $2a$.

The drilling tools of different diameters, as will be described in some detal hereinafter, are preferably exchanged successively with an automatic tool change (ATC) system and are each thereby successively brought into drilling positions preprogrammed in conjunction with the drilling positions and sizes of other tools in a manner such that there results an optimum distribution of sets of multiple formed holes $3l$, $3m$ and $3n$ of different sizes which substantially fill a volume destined to constitute the cavity 2 desired. Furthermore, as shown in FIG. 1(A), a plurality of oblique holes should preferably be formed with a tool or tools $4s$ to constitute passages for the machining liquid in the subsequent electrical machining stage, thereby enhancing the efficiency of electrical machining for finishing.

In the preliminary drilling operation which intrinsically affords a high rate of stock removal (e.g. 1000 gr/second for a steel material), it is desirable that a maximum amount of stock be removed from the workpiece 1 within the region thereof defined by the imaginary contour $2b$. In the subsequent electrical machining stage, a minimum amount of stock left is removed to yield a precision-shaped contour $2b$ by taking advantage of high precision shaping ability of electrical machining. The electrical machining stage should preferably employ an EDM process and the description hereafter will be made with particular reference to EDM for the finish machining step.

For the preliminary machining operation any of various forms of drilling multiple holes 3 within the region of the workpiece 1 defined by boundaries $2a$ and $2b$ may be adopted. FIG. 3 shows a preferred example. It is shown that multiple large holes $3l$ of a diameter D1 are formed by means of the drilling tool $4l$ to locate their centers at coordinates (X1, Y2), (X1, Y3), ... (X2, Y1), (X2, Y2), ... (X3, Y1), (X3, Y2), ... where X2−X1=X3−X2= ... =Y2−Y1=Y3−Y2=Y4−Y3= ... =D1. After forming the large holes $3l$, multiple medium-sized holes $3m$ of a diameter D2 are formed, each among and tangentially with adjacent large holes $3l$, by means of the drilling tool $4m$. Finally, the drilling tool $4n$ is used to form multiple small holes $3n$ in a zone defined between the rim $2a$ of the imaginary cavity 2 and the group of holes $3l$ and $3m$ located close to the rim $2a$.

In the case, the coordinates of successive points defining the rim $2a$ may be recorded on a memory medium such as a punched tape. The centers of those large, medium-sized and small holes $3l'$, $3m'$ and $3n'$ closer to the rim $2a$ are positioned to locate these holes substantially equi-distantly spaced from the boundary $2a$, that is, spaced from the latter by a distance wl which satisfies the relationship wo≦w≦wl where wo and w are given values.

As shown in FIG. 4, each hole 3*l*, 3*m*, 3*n* is drilled to a depth spaced by an equal distance ΔZ from the desired contour 2*b* in the drilling direction. Thus, the coordinates of successive points defining the desired contour 2*b* are preprogrammed and stored on a memory medium such as punched tape. The drilling tool 4*l*(4*m*, 4*n*) is advanced until its end face reaches a position where the minimum distance from points (Xi, Yi, Zi) on the contour surface 2*b* in the direction of the Z-axis becomes a predetermined value ΔZ.

Figure 5:
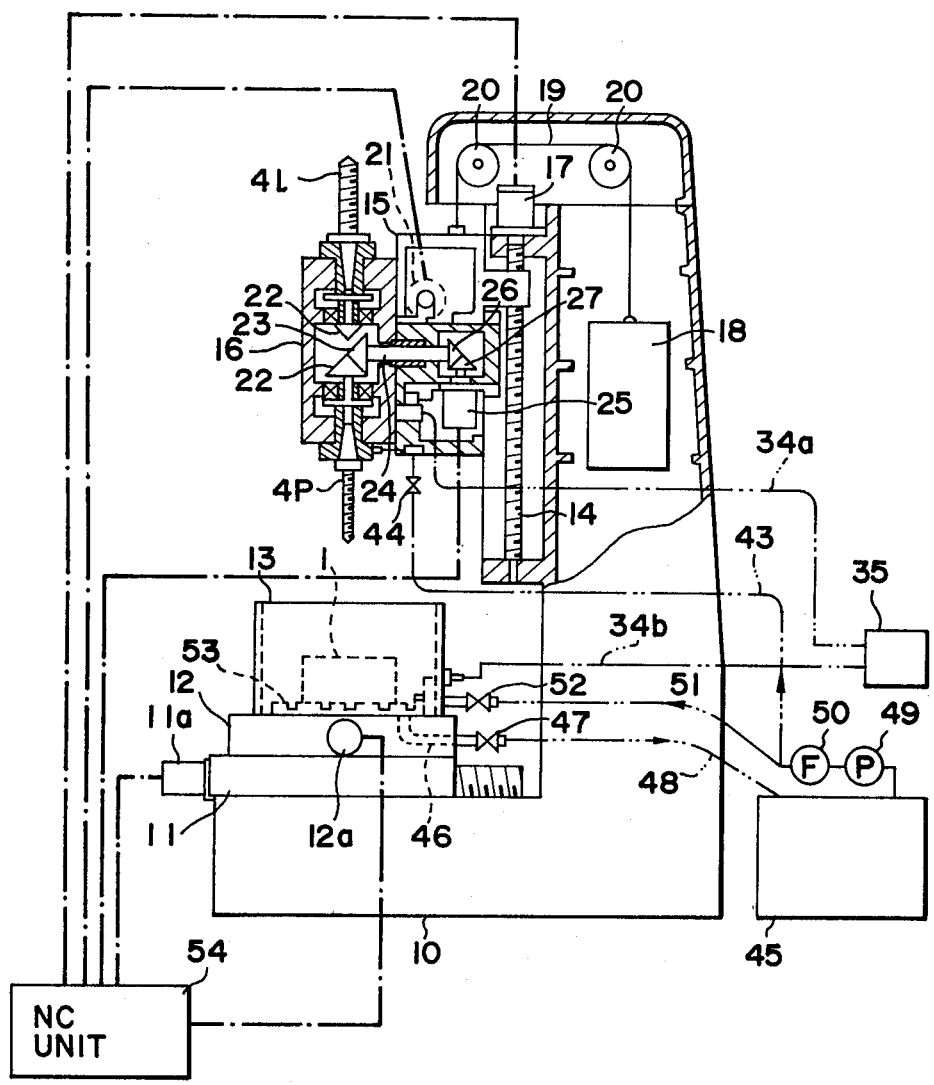
FIG. 5 is a side view, partly in section and partly in elevation, diagrammatically illustrating an apparatus for carrying out a method of this invention.
Figure 7:
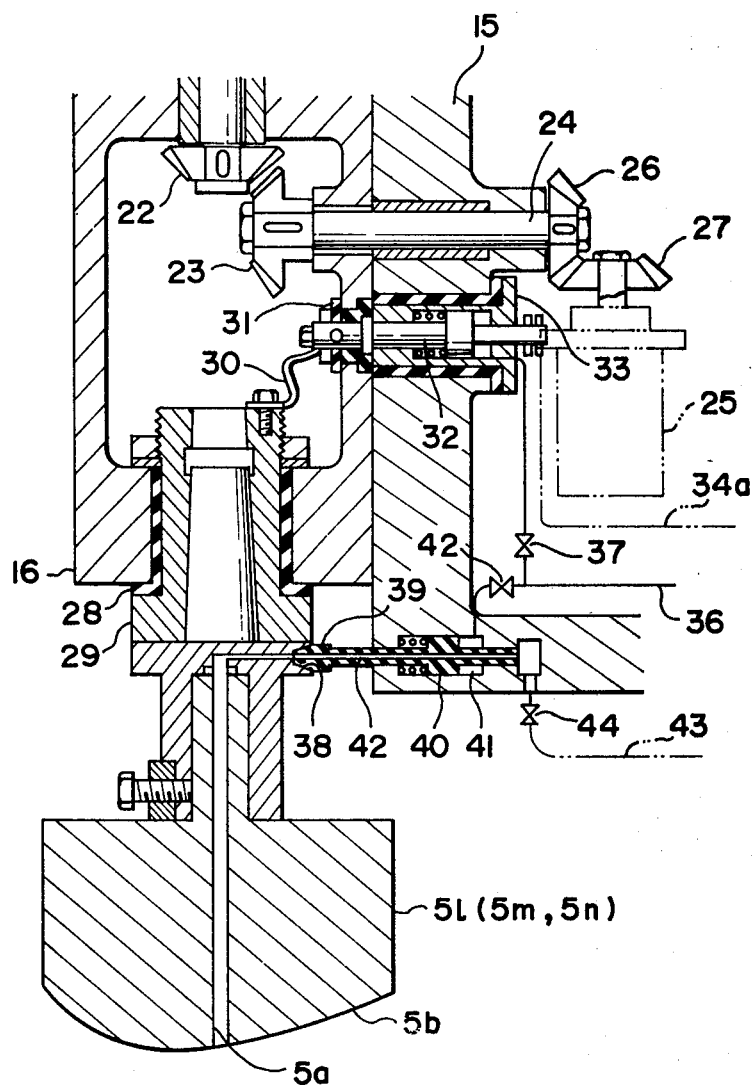
FIG. 7 is a side-sectional view diagrammatically illustrating a portion of the apparatus of FIG. 5 arranged to electrically machine the drilled workpiece.

FIGS. 5 to 7 shows an apparatus designed to carry out the method of the present invention. As shown in FIG. 5, the apparatus includes a bed 10 which horizontally carries thereon a pair of drive tables 11 and 12 formed in a cross-feed arrangement. The upper table 12 has a worktank 13 securely mounted thereon in which the workpiece 1 is fixedly positioned. The table 11 is adapted to be driven by a motor 11*a* to displace the worktank 13 and hence the workpiece 1 in the direction of Y-axis. The table 12 is adapted to be driven by a motor 12*a* to displace the worktank 13 and hence the workpiece 1 in the direction of the X-axis.

The apparatus also has a vertical portion extending upright from the bed 10 and containing a lead screw 14 extending in the direction of the Z-axis. The lead screw carries a mounting assembly 15 for a tool carriage 16 and is driven by a motor 17 to vertically move the tool carriage 16. The assembly 15 and the tool carriage 16 are suspended against gravity by means of a counterbalance mechanism comprising a weight 18 and a wire 19 trained over rollers 20.

The tool carriage 16 is arranged to be rotatable relative to the mounting assembly 15 and to be rotated by a motor 21 shown by a phantom line. As shown in FIG. 6, the tool carriage 16 holds a plurality of drilling tools of different diameters 4*l*, 4*m*, 4*n*, . . . 4*p* and also EDM tool electrodes 5*l*, 5*m*, 5*n*. As mounted on the tool carriage 16, each drilling tool is coupled to a corresponding bevel gear 22. When brought into a machining position by a rotation of the motor 21, each bevel gear 22 is brought into engagement with a bevel gear 23 secured to a rotary shaft 24. The rotary shaft 24 is rotated by a motor 25 via bevel gears 26 and 27 to rotate the bevel gear 22 and hence the drilling tool coupled thereto.

Referring to FIG. 7, each of EDM tool electrodes 5*l*, 5*m*, 5*n* is adapted to be mounted on the tool carriage 16 via an electrical insulator 28 and a conductive holding element 29 which is connected via a wire conductor 30 to a disk conductor 31 in contact with a conductive piston rod 32 which is movably received in a cylinder 33 and electrically connected via a lead conductor 34*a* to one output terminal of an EDM power supply 35 (FIG. 5). The other output terminal of the EDM power supply 35 is electrically connected to the workpiece 1 via a lead conductor 34*b*. A pressure fluid is introduced from a source 36 via a valve 37 into the cylinder 33 to bring the piston rod into electrical contact with the disk conductor 31 to establish EDM circuit of the tool electrode 5*l*, (5*m*, 5*n*) and the workpiece 1 with the power supply 35.

The EDM tool electrode 5*l* (5*m*, 5*n*) is formed with an internal bore 5*a* open to the machining face 5*b* and having a fluid inlet 38 in the form of a tapered opening. The tapered opening 38 is shown in mating engagement by an elongate element 39 which is an integral portion of a spool 40 movably received in a cylindrical recess 41, the latter being formed in the mounting assembly 15. A fluid passageway formed in and extending through the spool 40 and the projection is designated at 42. The pressure fluid from the source 36 is supplied into the cylindrical recess 41 via a valve 42 to displace the bored projecting element 39 of the spool 40 into engagement with the tapered opening 39 to communicate the fluid passageway 42 with the internal bore 5*a* of the electrode 5*l* (5*m*, 5*n*). An EDM machining liquid is then supplied from a source via a conduit 43 and a valve 44 and the fluid passageway 42 into the internal bore 5*a* of the tool electrode.

Referring back to FIG. 5, the source of the EDM machining liquid comprises a reservoir 45 for receiving a spent EDM liquid from the worktank 13 via a drain 46, a valve 47 and a conduit 48. The liquid in the reservoir 45 is drawn by a pump 49 and supplied via a filter 50, a conduit 51 and an inlet valve 52 into the worktank 13. The workpiece 1 is shown as securely supported on a conductive worktable 53 electrically connected to the EDM power supply 35 via the conductor 34*b*. The motors 11*a*, 12*a*, 20, 21 and 25 are operatively connected to an NM (numerical control) unit 54.

In operation of the apparatus shown in FIGS. 5 and 7, a predetermined set of drilling tools 4*l*, 4*m*, 4*n*, . . . , 4*p* and a predetermined set of EDM tool electrodes 5*l*, 5*m*, . . . are mounted in position on the tool carriage 16 and a workpiece 1 is securely mounted on a worktable 53. A set of programmed tapes or other memory media prepared by a CAD or CAM system is used to operate the NC unit 54 to drive the motors 11*a*, 12*a*, 20, 21 and 25.

For example, the motor 21 for tool selection is first operated to select a drilling tool 4*l* of a large diameter for positioning it so as to be oriented vertically downwards and in juxtaposition with the workpiece 1 mounted on the worktable 53. The X-axis and Y-axis displacement motors 11*a* and 12*a* are then driven to move the workpiece 1 and to locate a programmed center of one of large holes to be drilled, directly below the axis of the drilling tool 4*l*. Thereafter the motor 14 is rotated in one direction to rotate the drilling tool 4*l* and the motor 17 is driven to move down the mounting assembly 15 and the tool carriage 16 carried thereby to advance the rotating tool 4*l* into the workpiece 1. The mounting assembly 15 is moved down to a programmed depth and thereafter the motor 17 is rotated in the opposite direction to retract the tool 4*l* to the initial position. The NC unit 54 then furnishes the motors 11*a* and 11*b* with a programmed command to displace the workpiece 1 and to locate the drilling tool 4*l* coaxially with the center of a next programmed large hole. The motor 17 is then commanded again to commence advancing the drilling tool 4*l* and to continue the advance until a programmed drilling depth is achieved. In this manner, a programmed number of multiple holes are formed in the workpiece within a programmed region thereof defined by boundaries 2*a* and 2*b*. After completing the programmed rough-drilling operation with the large-diameter drilling tool 4*l*, the motor 21 is operated with a next command signal from the NC unit 54 to rotate the tool carriage 16. The carriage 16 is rotated to bring a tool 4*m* of a medium diameter into juxtaposition with the workpiece 1 and the successive programmed forming of multiple medium-sized holes follows. Successive cycles of drilling operations for multiple holes of different sizes are carried out at a high machining rate so that for EDM, only a minimum amount of stock remains to be removed in the region of the workpiece 1 destined to constitute the desired cavity 2.

After the formation of the multiple holes, the NC unit 54 operates to drive the motor 21 and the motors 11a and 12a so that a tool electrode 5 of a shape complementary to that of the desired cavity 2 is located above the region of the workpiece 1 in which the multiple holes have been formed. The tool electrode 5 is located to position the machining surface in parallel with the imaginary contour 2b. The motor 17 is driven to bring the tool electrode 5 into the worktank 13 and to position the electrode 5 into an EDM relationship with the workpiece 1. The valves 37 and 42 are opened to introduce the pressure fluid into the cylinders 33 and 41 whereby to bring the piston 32 into electrical contact with the disk conductor 31 on the one hand and to connect the internal bore 5a of the electrode 5 with the EDM liquid supply conduit 43 on the other hand. The pump 49 is driven to introduce the EDM liquid via the internal bore 5a of the electrode 5 into the worktank 13 and to circulate it between the latter and the worktank 45 via the conduit 48, the filter 50 and the conduit 51. The EDM power supply 35 is switched on to develop a machining voltage between the tool electrode 5 and the workpiece 1 across the machining gap. The tool electrode 5 continues to be advanced, permitting a succession of time-spaced electrical discharges to develop across the machining gap to electroerosively remove stock from those portions of the workpiece which are directly opposed with the machining face 5b of the tool electrode 5 and subjected to the electrical discharges. As a result, the previously unmachined portions of stock of the workpiece 1 among the drilled holes are progressively removed or machined. The tool carriage 16 is advanced until the tool electrode 5 reaches a preprogrammed depth, producing a complete form of the desired cavity 2 in the workpiece 1.

Preferably in the EDM stage, a plurality of similar tool electrodes should be employed. Thus, a rough machining electrode 5l is first used to roughly produce the cavity 2 at a relatively high rate of EDM stock removal (e.g. 30 gr/second) for a steel material by following the procedure described above. The roughing electrode is then replaced by a finishing tool electrode 5m to reform the rough-machined cavity at a relatively low rate of EDM stock removal (e.g. 0.5 gr/second for the steel material) to yield the cavity contour 2a and 2b with a high precision and better surface finish. A medium-finish machining step utilizing a corresponding tool electrode 5n may be employed subsequent to the roughing step and prior to the finishing step.

What is claimed is:

1. A method of forming a cavity of a desired three-dimensional contour in a workpiece, comprising the steps of:

(a) mechanically drilling a multiplicity of holes in a said workpiece substantially all over but within a three-dimensional region which is destined to constitute said cavity and is bounded by a programmed outline corresponding to said desired three-dimensional contour whereby only a minimum of stock is left unmachined in said workpiece within said region; and therefter (b) electroerosively machining said minimum left unmachined stock among said holes and within said programmed region with at least one electrical machining tool electrode having a machining surface which is complementary in shape with said desired contour and is positioned to lie in parallel with said programmed outline, by: (b1) passing an electrical machining current across a machining gap between said machining surface and said region in the presence of an electrical machining liquid in said holes and said gap while (b2) advancing said tool electrode relatively into said workpiece, with said parallelism maintained, so as to hold said machining gap spacing substantially constant until said machining surface reaches a position spaced by said spacing from said programmed outline.

2. The method defined in claim 1 wherein in step (a) said multiple holes are drilled respectively to individually predetermined depths and have their individual bottoms which are substantially equi-distantly spaced from said programmed outline.

3. The method defined in claim 2 wherein said multiple holes include a set of holes obliquely intersecting another set of the holes, step (b) further including the step of flushing said machining liquid through said oblique holes to create a dynamic flow of said machining liquid through said machining gap.

4. The method defined in claim 1 wherein each of said drilled holes has a depth to diameter ratio in excess of 1.

5. A method of forming a cavity of a desired three-dimensional contour in a workpiece, comprising the steps of:

(a) mechanically drilling a multiplicity of holes in a said workpiece substantially all over but within a three-dimensional region which is destined to constitute said cavity and is bounded by a programmed outline corresponding to said desired three-dimensional contour whereby only a minimum of stock is left unmachined in said workpiece within said region; and thereafter (b) electroerosively machining said minimum left unmachined stock among said holes and within said programmed region with at least one electrical machining tool electrode having a machining surface which is complementary in shape with said desired contour and is positioned to lie in parallel with said programmed outline, by: (b1) passing an electrical machining current across a machining gap between said machining surface and said region in the presence of an electrical machining liquid in said holes and said gap, and (b2) advancing said at least one tool electrode relatively into said workpiece while maintaining said parallelism and holding said machining gap spacing substantially constant until said machining surface reaches a position spaced by said spacing from said programmed outline, step (a) being carried out with a plurality of drilling tools having different tool sizes to produce the corresponding plural sets of holes different in diameter.

6. The method defined in claim 5 wherein in step (a) said multiple holes are drilled respectively to individually predetermined depths such that an outline defined by the floor regions of said holes substantially conforms to and are substantially equi-distantly spaced from said programmed outline.

7. The method defined in claim 5 wherein said at least one tool electrode includes a plurality of electrodes including roughing and finishing electrodes and wherein in step (b) at least a substantial portion of said left unmachined stock remaining among said multiple holes is electroerosively removed by at least one said roughing electrode and at least a portion of said unmachined stock remaining between said outline defined by the floor regions of said holes and said programmed outline is electroerosively removed with at least one said finishing electrode.

8. The method defined in claim 5 wherein step (a) comprises: drilling said plural sets of holes successively in said region.

9. The method defined in claim 5, claim 8 or claim 6 wherein at least most of said multiple holes are formed so as to extend substantially in parallel with one another.

10. The method defined in claim 9 wherein said multiple holes include a plurality of holes obliquely intersecting at least some of said parallel holes, step (b) further including the step of flushing said machining liquid through said oblique holes to create a dynamic flow of said machining liquid through said machining gap.

11. The method defined in claim 9 wherein said parallel holes are oriented in a direction substantially the same as the direction in which at least one said tool electrode is advanced in step (b2).

12. The method defined in claim 11 wherein said holes at least in a set of the largest hole diameter are drilled in said region with their centers substantially equidistantly spaced apart from one another, and said holes at least in another set are drilled in interstices among said holes of the largest hole diameter.

13. The method defined in claim 12 wherein a further set of holes having a smallest hole diameter are included in said multiple holes and are drilled at least in a zone of said region which is closer to said programmed outline.

14. A method of forming a cavity of a desired three-dimensional contour in a workpiece, comprising the steps of:
(a) mechanically drilling a multiplicity of holes in a said workpiece substantially all over but within a three-dimensional region which is destined to constitute said cavity and is bounded by a programmed outline corresponding to said desired three-dimensional contour whereby only a minimum of stock is left unmachined in said workpiece within said region; and thereafter
(b) electroerosively machining said minimum left unmachined stock among said holes and within said programmed region with at least one electrical machining tool electrode having a machining surface which is complementary in shape with said desired contour and is positioned to lie in parallel with said programmed outline, by: (b1) passing an electrical machining current across a machining gap between said machining surface and said region in the presence of an electrical machining liquid in said drilled holes and said gap while (b2) advancing said tool electrode relatively into said workpiece, with said parallelism maintained, so as to hold said machining gap spacing substantially constant until said machining surface reaches a position spaced by said spacing from said programmed outline, said multiple holes being drilled in step (a), respectively to individually predetermined depths such that an outline defined by the floor regions of said holes substantially conforms to and are substantially equi-distantly spaced from said programmed outline.

15. The method defined in claim 14 wherein at least most of said multiple holes are formed so as to extend substantially in parallel with one another.

16. The method defined in claim 15 wherein said multiple holes include a plurality of holes obliquely intersecting said parallel holes, step (b) further including the step of flushing said machining liquid through said oblique holes to create a dynamic flow of said machining liquid through siad machining gap.

17. A method of forming a cavity of a desired three-dimensional contour in a workpiece, comprising the steps of:
(a) mechanically drilling a multiplicity of holes in a said workpiece substantially all over but within a three-dimensional region which is destined to constitute said cavity and is bounded by a programmed outline corresponding to said desired three-dimensional contour whereby only a minimum of stock is left unmachined in said workpiece within said region; and thereafter
(b) electroerosively machining said minimum left unmachined stock among said holes and within said programmed region with at least one electrical machining tool electrode having a machining surface which is completely in shape with said desired contour and is positioned to lie parallel with said programmed outline, by: (b1) passing an electrical machining current across a machining gap between said machining surface and said region in the presence of an electrical machining liquid in said drilled holes and said gap while (b2) advancing said tool electrode relatively into said workpiece, with said parallelism maintained, so as to hold said machining gap spacing substantially constant until said machining surface reaches a position spaced by said spacing from said programmed outline, said multiple holes drilled in step (a) including a set of holes obliquely intersecting another set of the holes, step (b) including the step of flushing said machining liquid through said oblique holes under a negative pressure to create a dynamic flow of said machining liquid through said machining gap.

18. An apparatus for carrying out the method defined in claim 1, claim 5, claim 14 or claim 17, comprising:
a tool carriage for carrying at least one drilling tool and at least one electrical machining tool electrode; control means;
means operable in response to command signals from said control means for driving said tool carriage to selectively bring said at least one drilling tool, for carrying out step (a), into a drilling relationship with said at least one tool electrode, for carrying out step (b) subsequent to step (a), into an electrical machining relationship with, said workpiece, respectively;
means for rotating said drilling tool in step (a);
means for supplying said electrical machining liquid into said holes and said machining gap in step (b);
means selectively operable in step (b) for supplying said electrical machining current between said tool electrode and said workpiece; and
means for advancing said drilling tool in step (a) and said tool electrode in step (b), relatively into said workpiece to drill each of said multiple holes in step (a) and to electroerosively machine said left unmachined stock in step (b), respectively.

19. The apparatus defined in claim 18 wherein said tool carriage is arranged for carrying a plurality of said drilling tools of different sizes to produce corresponding plural sets of holes of different diameters constituting said multiple holes.

20. The apparatus defined in claim 19 wherein said tool carriage is arranged to carry a plurality of said electrodes including a roughing and a finishing electrode.

* * * * *